Oct. 7, 1969  P. A. DICKE  3,471,760
SEMIAUTOMATIC ROTATOR

Filed Nov. 3, 1966  2 Sheets-Sheet 1

INVENTOR.
PAUL A. DICKE
BY
EDWARD D. O'BRIAN
ATTORNEY

Oct. 7, 1969     P. A. DICKE     3,471,760

SEMIAUTOMATIC ROTATOR

Filed Nov. 3, 1966     2 Sheets-Sheet 2

INVENTOR.
PAUL A. DICKE
BY EDWARD D. O'BRIAN
ATTORNEY

United States Patent Office 3,471,760
Patented Oct. 7, 1969

3,471,760
SEMIAUTOMATIC ROTATOR
Paul A. Dicke, New Bremen, Ohio, assignor to Crown Controls Corporation, New Bremen, Ohio, a corporation of Ohio
Filed Nov. 3, 1966, Ser. No. 591,726
Int. Cl. H02p 1/54, 5/46, 7/74
U.S. Cl. 318—41                                    7 Claims

ABSTRACT OF THE DISCLOSURE

This invention is directed to a semiautomatic rotator, and particularly to a rotator structure which is designed for the remote rotary control of a device, for example a television or similar antenna. The semiautomatic rotator comprises a remote unit which is adapted to be mechanically connected to the device to be rotated, which structure is conventional. This invention is directed to improvements in the control structure for controlling and indicating the positioning of the remote unit.

The control unit comprises a housing in which the control and indicating components are located. An externally manipulatable switch mounted on the housing selectively connects a source of power to the remote motor. Additionally, at the same time, it selectively connects the source of power to an indicator motor within the control housing. As a primary feature, the control motor drives an orientation indicating dial, the position of which corresponds to the structure driven by the remote motor. Thus, the orientation indicating dial moves as an analog of the remote motor and indicates positioning of the remote motor. Since the remote motor preferably includes a stop which prevents continuous rotation of the driven antenna through the more than 360°, the control motor preferably includes control structure which disconnects power to the remote motor when the remote motor is indicated to reach the end of its rotation. This control structure includes a cam driven by the indicator motor, which cam moves at the indicated end of rotation of the remote motor and electrically disconnects the remote motor from the power source. Thus, the control unit of this invention indicates the position of the structure driven by the remote motor and preferably disconnects both the indicator motor and the remote motor from the power source when the remote motor reaches the end of its permissable rotation, as indicated by the analog movement of the indicator motor.

BACKGROUND

Since the advent of television there has been a considerable demand for inexpensive structures which are capable of rotating a television antenna to obtain optimum reception. In order to enjoy the wide market and to meet the necessities of value versus cost, such rotators must be inexpensive, yet reliable. The rotators in use for rotation of other types of antennas, and signaling their angular position, were readily available but of such high cost that they do not meet the economic requirements. Such rotators are known for radar antennas, and a few expensive units have been built for the positioning of "ham" radio antennas. However, these did not meet the economic requirements, and thus enjoyed little success in the television antenna rotation field.

The requirements of the television antenna rotation field, in addition to economy, for best use of such units include the requirement that the control unit adjacent the television set reasonably accurately indicate the remote antenna orientation. Another factor involved is the fact that television lead in wires are not provided with slip rings and thus the rotation of the antenna is limited to approximately 360° with respect to the ground. This reflects upon both controlability and the structure of the indicating means.

A number of prior structures meeting the requirements have been built. They are presently available on the market, but continually are under study for improvement, both in economic and operating characteristics. One of the prior devices is shown in Paul A. Dicke Patent No. 3,102,218. That device is eminently suitable, and employs an automatic positioning system. The device of this prior patent is widely used and is suitable to meet the needs, but the fact that it includes an automatic positioning system makes it somewhat more complex than is necessary to meet the minimum requirements of controlability and indication. The rotator structure of this prior patent cannot be constructed to meet the requirements of the most economical situations.

Other prior antenna rotation and indicating devices employ step by step positioning of the antenna, which is not optimum for precise control of antenna position and thus optimum reception. Other such rotators are on the side of complexity and high cost, particularly in those situations where greater precision was required. That class of devices employed selsyns both for drive and for indication, and this complexity raised the cost of such units beyond the economic feasibility for television antenna rotation applications. Thus, the marketplace demonstrated a need for a television antenna rotator which was both continuous and infinitely controlable, together with a continuous indication of the orientation of the television antenna, all built into an economic and reliable package.

DESCRIPTION

Accordingly, it is an object of this invention to provide a semiautomatic rotator which comprises a control means which is interconnected to and controls a remote motor which in turn is connected to rotate an antenna, the control unit including both directional rotational control of the remote motor and an indication of its position. It is a further object of this invention to provide a semiautomatic rotator wherein the control unit includes an analog control motor which rotates correspondingly to the remote motor so that the analog indicator motor in the control unit indicates the position of the remote motor. It is a further object of this invention to provide a semiautomatic rotator wherein the indicator motor disconnects the power from the remote motor when the indicator motor indicates that the remote motor has reached the end of its permissive rotation. It is a further object of this invention to provide a semiautomatic rotator which is economical and trouble free so that it may be made available in large quantities to meet the public demand for an economical, trouble-free antenna rotator which properly controls and indicates the position of a remote antenna. Other objects and advantages of this invention will become apparent from a study of the following portion of this specification, the claims and the attached drawings.

Figure 1:
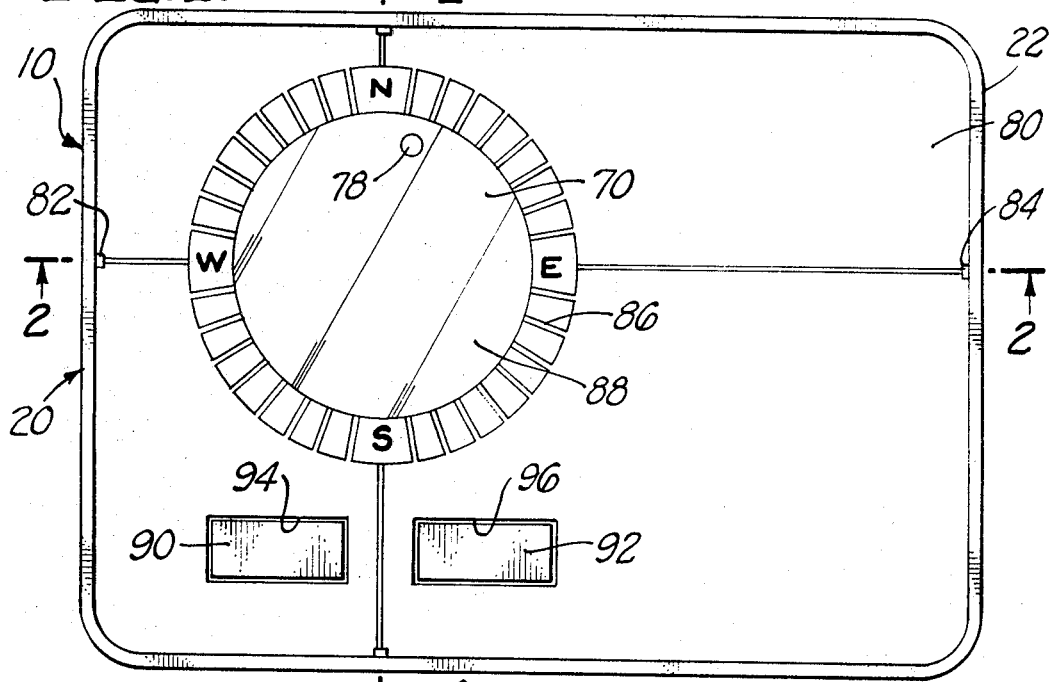
FIG. 1 is a top plan view of the control housing of the semiautomatic rotator of this invention.

Referring to the drawings, the control unit which serves as a semiautomatic control is generally indicated at 10.

Figure 6:
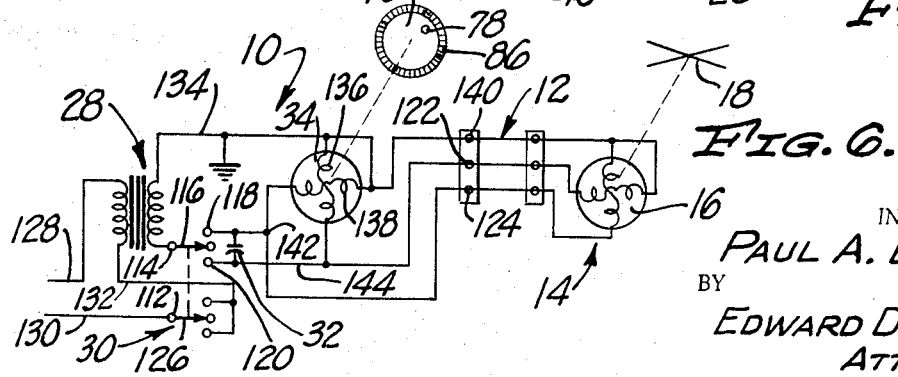
FIG. 6 is a schematic drawing of the electric circuit showing the relationship between the components of the semiautomatic rotator of this invention.

As is seen in FIG. 6, the control unit 10 is connected by wires 12 to remote unit 14. Remote unit 14 is a conventional unit which is preferably mounted upon an antenna mast. Motor 16 is mechanically connected through suitable gear reduction to rotate television antenna 18, or such other structure for which such controlled rotation is desired. The structure of remote unit 14 is known and conventional and forms no part of this invention except as being the unit which is controlled by control unit 10.

Figure 4:
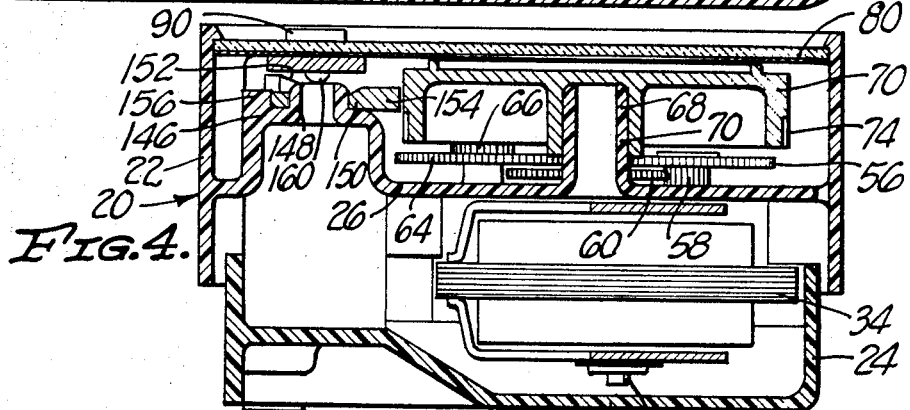
FIG. 4 is a section taken generally along the line 4—4 of FIG. 1.

Control unit 10 comprises housing 20 in which the control unit functional components are mounted. Housing 20 comprises upper housing half 22 and lower housing half or base 24. Each of the housing halves is provided with side walls and arranged so that the side walls of upper housing half 22 extend over the side walls of base 24. This arrangement is particularly well shown in FIGS. 2 and 4. Each of the housing halves is preferably arranged for injection molding with straight pull dies, and each incorporates such walls, supports and studs as are necessary to position and support the components within housing 20. Wall 26 extends across upper housing half 22 between the side walls thereof to perform its share of this location and support function.

Figure 2:
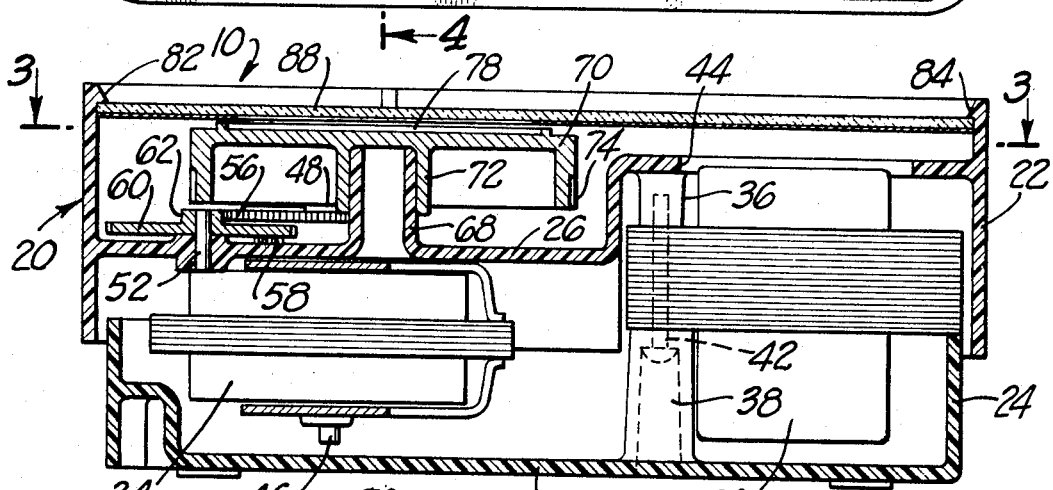
FIG. 2 is a section taken generally along the line 2—2 of FIG. 1.

Referring to FIG. 6, the control unit contains transformer 28, switch 30, capacitor 32 and indicator motor 34. Transformer 28 is shown in FIG. 2 as being mounted against wall 26 by means of a plurality of posts, one of which is indicated at 36. A similar post 38 is mounted on bottom wall 40 of base 24. Screws, one of which is indicated at 42, are engaged in posts 36 and 38, and extend through the core of transformer 28 so as to hold the transformer in position and retain upper housing half 22 secured to base 24. Opening 44 is provided in wall 26 adjacent the winding of transformer 28 to provide clearance with respect to the winding and to provide for ventilation of the transformer.

Figure 3:
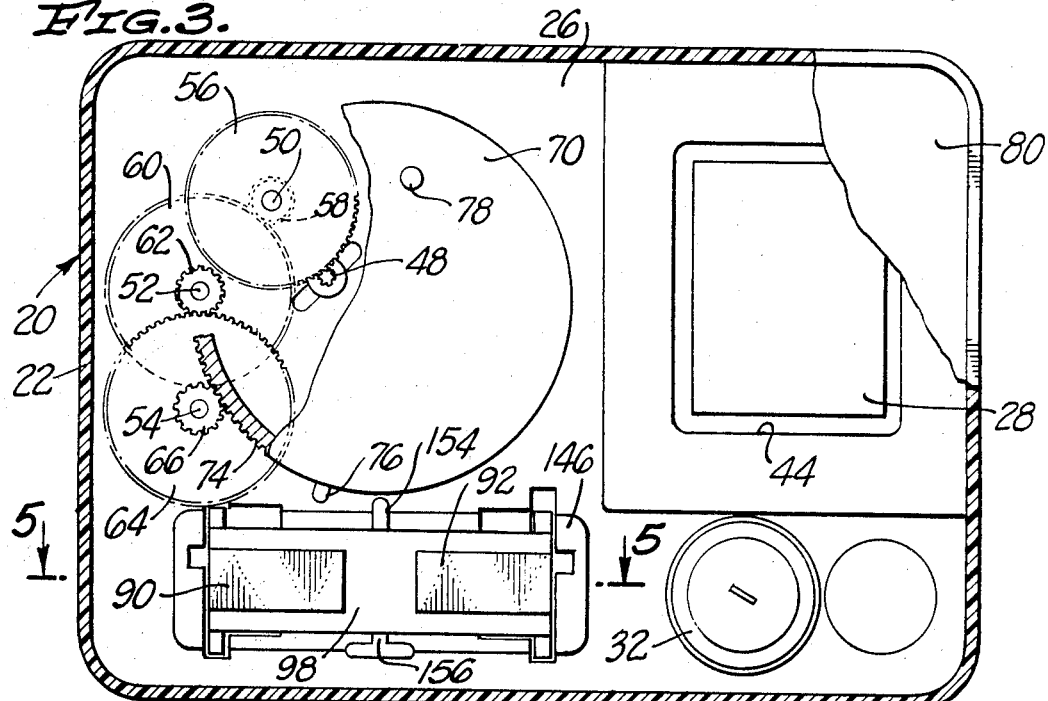
FIG. 3 is a section, with parts broken away, taken generally along the line 3—3 of FIG. 2.

Similarly, indicator motor 34 is secured to the under side of wall 26. Securement is accomplished by means of screws, not shown, passing through the iron stack of the motor and engaging in wall 26. Motor 34 has drive shaft 46 rotatably mounted therein. Drive shaft 46 extends upward through an opening in wall 26 and terminates in drive pinion 48. As is seen in FIGS. 2 and 3, shafts 50, 52 and 54 are mounted in wall 26 and extend upwardly therefrom to rotatably carry the gears of the gear reduction set driven by indicator motor 34. First gear 56 is in engagement with drive pinion 48 and carries first pinion 58 thereon. The first pinion and first gear are secured together and together rotate on shaft 50. Second gear 60 and second pinion 62 are secured together and are rotatably mounted upon shaft 52. Second gear 60 is in engagement with first pinion 58. Third gear 64 carries upstanding final pinion 66. This third gear and final pinion are rotatable together and are rotatably mounted upon shaft 54. Third gear 64 is in engagement with second pinion 62.

Upstanding bearing boss 68 is formed as a portion of wall 26. Indicator dial 70 has downwardly projecting bearing sleeve 72 engaged around boss 68 for the rotatable support of dial 70. Dial 70 has gear teeth 74 formed around its lower outside edge. Final pinion 66 engages with the gear teeth 74 so that dial 70 rotates in accordance with the rotation of indicator motor 34. Dial 70 carries dog 76 extending radially from the outside periphery for the control of switch 30, as is hereinafter described. Dial 70 also carries indicia 78 which indicates the relative angular position of dial 70.

Top cover 80 is formed to snap under engagement hooks 82 and 84, as well as such other engagement hook as may be necessary to properly hold cover 80 in place. Cover 80 is prevented from further downward motion by abutments, not shown, formed on upper housing 22 and positioned directly beneath the cover. Top cover 80 is preferably made of transparent polymer composition material which is rendered opaque over a substantial area thereof by means of the bottom application of suitably decorative and opaque material. This application includes the application of indicia 86 which surround transparent area 88 through which at least a portion of indicator dial 70, and indicia 78 are seen. The position of indicia 78 with respect to indicia 86 indicates the orientation of antenna 18.

Figure 5:
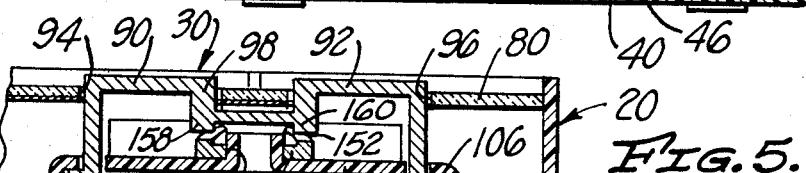
FIG. 5 is an enlarged partial section taken generally along the line 5—5 of FIG. 3.

Switch 30 is best shown in FIGS. 1, 3, 4 and 5. It comprises manually engageable pushbuttons 90 and 92 which extend upward respectively through openings 94 and 96 in top cover 80. Thus, they are positioned adjacent indicator dial 70 and are manually accessible from the top of control unit 10. Pushbuttons 90 and 92 are formed on switch bar 98 which has downwardly extending operating fingers 100 and 102. Operating fingers 100 and 102 pass through suitable openings in wall 26, as is shown in FIG. 5. Furthermore, these operating fingers respectively carry stops 104 and 106 which engage under wall 26 to determine the upward limit position of switch bar 98.

Spring switch blades 108 and 110 are preferably the same piece of metal mounted upon post 112 and electrically connected to securing rivet 114. Together blades 108 and 110 form the moving switch contact 116 shown in FIG. 6. Operating fingers 100 and 102 respectively engage upon switch blades 108 and 110 and the resiliency of these switch blades urges switch bar 98 to the upward position shown, with stops 104 and 106 in engagement beneath wall 26. Contacts 118 and 120 are respectively positioned below for respective engagement by switch blades 108 and 110. Thus, manual depression of pushbutton 90 overcomes the stress of spring switch blade 108 and moves blade 108 down into electrical contact with contact 118. Alternatively, manual depression of pushbutton 92 causes finger 102 to move switch blade 110 into electric contact 120. Terminal screws 122 and 124 are located so as to be accessible from the bottom of housing 20 for connection of the interconnecting wires 12 to contacts 118 and 120.

Referring to FIG. 6, switch 30 includes, in addition to switch contact 116, switch contact arm 126. Switch contact arm 126 resembles switch blades 108 and 110, and is fastened by a rivet similar to rivet 114 upon post 112, all positioned behind this structure in FIG. 5. Thus, switch contact arm 126 is operated in such a manner that one or the other contacts is closed when one or the other of pushbuttons 90 and 92 is depressed. Referring further to FIG. 6, power is supplied from a conventional source, such as a household source of 115 volts A.C. at lines 128 and 130. Line 128 is connected to one side of the primary of transformer 28, and the other side of the primary is connected by line 132 to the contacts contractable by switch arm 126. Line 130 is connected to switch arm 126. Thus, upon actuation of either of the pushbuttons 90 or 92, the primary of transformer 28 is energized.

Further referring to FIG. 6, the secondary of transformer 28 has one leg connected to line 134, which line is connected to coils 136 and 138 of motor 34. Line 134 is also connected to terminal 140 for connection outside of the control unit by wires 12 to remote unit 14. The other side of the secondary of transformer 28 is connected to rivet 114 so that switch contact arm 116 can selectively connect between contacts 118 and 120, in the manner previously described. Contact 118 is connected by line 142 to one side of capacitor 32, to the other end of coil 138 and to terminal 124. Contact 120 is connected by line 144 to the other side of capacitor 32, to the other end of coil 136 and to terminal 122. This arrangement is such that coil 138 of motor 34 is directly connected across the secondary of transformer 28 when contact 118 is engaged by the pressing of button 90 while at the same time coil 136 is connected across the secondary through capacitor 32. This causes rotation of motor 34 in such a direction as to cause counterclockwise rotation of indicator dial 70, as seen from the top. Pressing pushbutton 92 connects contact 120 to the transformer secondary with the result that coil 136 is directly energized and coil 138 is energized through capacitor 32 for clockwise rotation of dial 70.

The coils of the remote motor 16 in remote unit 14 are connected in parallel to the coils of motor 34. Thus, the rotation of motor 16 is the same as the rotation of motor 34 and the rotation of antenna 18 is the same as the rotation of dial 70. The motors are suitably matched so that substantial synchronism is retained. Furthermore, the gear reduction in remote unit 14 has the same ratio as the gear reduction between motor 34 and dial 70 so that each makes a full revolution in substantially the same time. In order to prevent twisting of antenna wires, remote unit 14 is provided with a mechanical stop which limits the rotation of antenna 18 to substantially 360°. A stop is also provided in control unit 10 so that each of the units may be brought to the end of its rotative arc to return them to synchronism.

As is seen in FIG. 5, wall 26 has a raised portion 146 in which openings are formed for operating fingers 100 and 102, and under which stops 104 and 106 engage. Additionally, raised wall 146 carries bearing boss 148 which is raised above the general plane of raised wall 146. Bearing boss is positioned directly beneath the middle of switch bar 98 which carries pushbuttons 90 and 92. The boss is sufficiently high to prevent depression of both pushbuttons at the same time for simultaneous closing of contacts 118 and 120. Stop cam 150 is mounted upon bearing boss 148 and arranged for rotation thereabout. Stop cam 150 has cam face 152 which is higher toward the front of control unit 10, downward in the direction of FIG. 1 and beyond the plane of the drawing in FIG. 5. Furthermore, stop cam 150 has lug 154 which is in the path of dog 76, for operation thereby. Thus, stop cam 150 comprises an inner ring which embraces bearing boss 148, cam face 152 which is secured to the inner ring, and lug 154. Cam face 152 terminates before reaching the side directly opposite lug 154 so as to leave a space between the ends of the cam face. Since the cam face is radially outward from the ring around bearing boss 148, its ends form rotary limit stops for stop cam 150. These ends cooperate with stop 156 which is formed as a part of raised wall 146.

Cam followers 158 and 160 are respectively formed on the buttons of pushbuttons 90 and 92 and the cam followers face cam face 152. They are dimensionally arranged so that when dog 76 engages lug 154 to rotate cam 150, engagement of cam face 152 upon one or the other of the cam followers 158 or 160 raises the corresponding pushbutton to open switches and stop the motors. Thus, means to stop indicater dial 70 at the end of its rotative stroke is provided, without resorting to the high strength structure of a positive stop.

It is clear that the control unit for the antenna rotator described above is designed and organized in such a way that it is a reliable complete control unit. It has continuous indication of the position in a control unit which is economically built and yet provides long life and trouble-free operation.

While the form of apparatus herein described constitutes a preferred embodiment of the invention, it is to be understood that the invention is not limited to this precise form of apparatus, and that changes may be made therein without departing from the scope of the invention.

What is claimed is:

1. An antenna rotator control system comprising in combination
   - a remote motor arranged to rotate an antenna;
   - a housing;
   - an indicator motor within said housing electrically connected in parallel with said remote motor;
   - an indicator dial driven by said indicator motor to indicate its angular position and thus the position of the antenna;
   - a source of electric power;
   - first and second manually operable switches connected between said source of power and said indicator and remote motors, the closure of said first switch causing said indicator and remote motors to rotate together in a first direction, and the closure of said second switch causing said indicator and remote motors to rotate together in a second direction;
   - means for individually manually actuating said switches to position the antenna in a predetermined direction, said means including first and second push buttons extending through openings formed in said housing so as to be manually accessible from the exterior of said housing; and
   - means mounted to rotate with said indicator motor for causing the opening and preventing the further actuation of said switches at one preselected predetermined angular position of said indicator motor thus to limit electrically the rotation of said indicator and remote motors to substantially one revolution.

2. The system defined in claim 1 wherein said indicator dial includes means which cooperate with said actuating means to prevent the closure of one of said switches when said indicator motor rotates to a predetermined angular position.

3. The system defined in claim 1 wherein said indicator dial includes a dog arranged to rotate therewith, cam means cooperating with said dog physically to restrict the movement of the one of said push buttons which actuates the switch rotating the indicator motor in that direction thereby preventing the further actuation of said switch when said indicator dial rotates to a predetermined angular position and restricting the further rotation of the indicator dial in that direction by preventing further electrical energization of the indicator and remote motors while allowing said motors to be energized to rotate in the opposite direction by the manual actuation of the other of said push buttons.

4. The system of claim 1 further including means for mechanically limiting the rotation of said remote motor to one complete revolution in either direction, and wherein said means for preventing the actuation of said switches limits electrically the rotation of said indicator motor to one revolution thus allowing this angular position of said remote motor and said indicator motor to be brought into synchronism at the limits of their rotation.

5. A control unit for positioning a remotely located antenna driven by a remote motor, said unit comprising
   - an indicator motor adapted to be connected electrically in parallel with the remote motor;
   - an indicator dial connected to rotate with said indicator motor to indicate its angular position and thus the position of the remote motor;
   - first and second switches mounted within a housing, said switches including first and second contacts and a flexible resilient electrical conductor mounted to said housing between said contacts, said conductor being normally spaced from said first and second contacts and adapted to engage electrically one of said contacts to cause current to flow therethrough, the closure of said first switch energizing said indicator motor to rotate in a first direction, and the closure of said second switch causing said indicator motor to rotate in a second direction;
   - a switch actuator formed from a single unitary member, said member forming a pair of push buttons accessible from the exterior of said housing and a pair of downwardly extending operating fingers, each finger engaging a portion of said flexible resilient conductor to move said conductor selectively into engagement with one of said contacts;

stop means on each of said downwardly extending fingers cooperating with said housing to limit the upward motion of each of said fingers due to the resilience of said conductor; and means associated with said unitary member and operable by said indicator dial for preventing one of said fingers from moving downwardly when said indicator dial has rotated to a predetermined position thus preventing manual actuation of the one switch which causes said indicator motor to rotate further in the same direction.

6. The control unit of claim 5 further includes means cooperating with said switch actuators to prevent both of said fingers from moving downwardly together through a distance sufficient to cause said conductor to engage both said contacts simultaneously.

7. The control unit of claim 5 wherein said indicator dial includes a dog arranged to rotate therewith, wherein said means for preventing actuation of one of said fingers includes a cam rotatably mounted on said housing, and wherein said dog engages said cam to rotate it to such a position that it engages said switch actuator and prevents one of said switches from closing.

References Cited
UNITED STATES PATENTS

| | | | |
|---|---|---|---|
| 2,812,484 | 11/1957 | De Westfelt | 318—266 |
| 2,815,501 | 12/1957 | Benson et al. | 318—490 |
| 3,102,218 | 8/1963 | Dicke | 318—112 |

ORIS L. RADER, Primary Examiner

K. L. CROSSON, Assistant Examiner

U.S. Cl. X.R.

318—49, 266, 490

PO-1050
(5/69)

UNITED STATES PATENT OFFICE
CERTIFICATE OF CORRECTION

Patent No. 3,471,760    Dated October 7, 1969

Inventor(s)   Paul A. Dicke

It is certified that error appears in the above-identified patent and that said Letters Patent are hereby corrected as shown below:

Column 1, line 29, "control motor" should be -- indicator motor --.
Column 1, line 36, "control motor" should be -- indicator motor --.
Column 4, line 51, "contractable" should be -- contactable.

SIGNED AND
SEALED
FEB 17 1970

(SEAL)
Attest:

Edward M. Fletcher, Jr.
Attesting Officer

WILLIAM E. SCHUYLER, JR.
Commissioner of Patents